(12) United States Patent
Cajias et al.

(10) Patent No.: US 11,423,062 B2
(45) Date of Patent: Aug. 23, 2022

(54) APPARATUS AND METHODS FOR GENERATING UPDATE DATA FOR A MAP DATABASE

(71) Applicant: HERE GLOBAL B.V., Eindhoven (NL)

(72) Inventors: Raul Cajias, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 226 days.

(21) Appl. No.: 16/584,367

(22) Filed: Sep. 26, 2019

(65) Prior Publication Data

US 2021/0097092 A1    Apr. 1, 2021

(51) Int. Cl.
*G06F 16/29* (2019.01)
*G06F 16/22* (2019.01)
*G06F 16/23* (2019.01)

(52) U.S. Cl.
CPC .......... *G06F 16/29* (2019.01); *G06F 16/2246* (2019.01); *G06F 16/2379* (2019.01)

(58) Field of Classification Search
CPC ... G06F 16/29; G06F 16/2379; G06F 16/2246
See application file for complete search history.

(56) References Cited

U.S. PATENT DOCUMENTS

| | | | |
|---|---|---|---|
| 8,880,589 B2 | 11/2014 | Becker | |
| 8,892,522 B2 * | 11/2014 | Sugimoto | G09B 29/10 707/661 |
| 9,141,372 B1 | 9/2015 | Sarkar et al. | |
| 9,396,249 B1 * | 7/2016 | Balasubramanian | G06F 16/284 |
| 9,965,689 B2 | 5/2018 | Dos Santos Mendonca et al. | |
| 9,986,060 B2 | 5/2018 | Robinson | |
| 10,002,156 B2 | 6/2018 | Lublinsky et al. | |
| 2012/0191773 A1 | 7/2012 | Appleton | |
| 2012/0303263 A1 | 11/2012 | Alam et al. | |

(Continued)

FOREIGN PATENT DOCUMENTS

EP    2775410 A1    9/2014

OTHER PUBLICATIONS

Microsoft Corporation, "[MS-FILESYNC]: File Synchronization Protocol", retrieved from https://interoperability.blob.core.windows.net/files/MS-FILESYNC/[MS-FILESYNC].pdf, Mar. 19, 2019, pp. 1-48.

(Continued)

*Primary Examiner* — Huawen A Peng
(74) *Attorney, Agent, or Firm* — Ditthavong, Steiner & Mlotkowski

(57) ABSTRACT

An apparatus, a method, and a computer program product for obtaining map update data of a region are provided. The method comprises receiving a node identifier and a first node digest of an update candidate node; obtaining, based on the node identifier, a second node digest of the update candidate node; comparing the first node digest and the second node digest of the update candidate node; and generating, based on the comparison, the update data for the map database, the update data containing one of an indication of unchanged content; node digests of the child nodes of the update candidate node; or updated content corresponding to the update candidate node.

22 Claims, 10 Drawing Sheets

(56) References Cited

U.S. PATENT DOCUMENTS

| | | | |
|---|---|---|---|
| 2013/0328941 A1* | 12/2013 | Carbonneau | G01C 21/3878 345/667 |
| 2014/0108462 A1* | 4/2014 | Pfeifle | G06F 16/9027 707/795 |
| 2016/0140153 A1* | 5/2016 | Massarella | G06F 16/2272 707/743 |
| 2018/0299274 A1 | 10/2018 | Moghe et al. | |
| 2019/0155928 A1* | 5/2019 | Baruch | G06F 16/2246 |

OTHER PUBLICATIONS

Sharma, "Differential Map Updates for Highly Automated Driving and Enhanced Driver Assistance Services", Thesis, Dec. 2016, 91 pages.

* cited by examiner

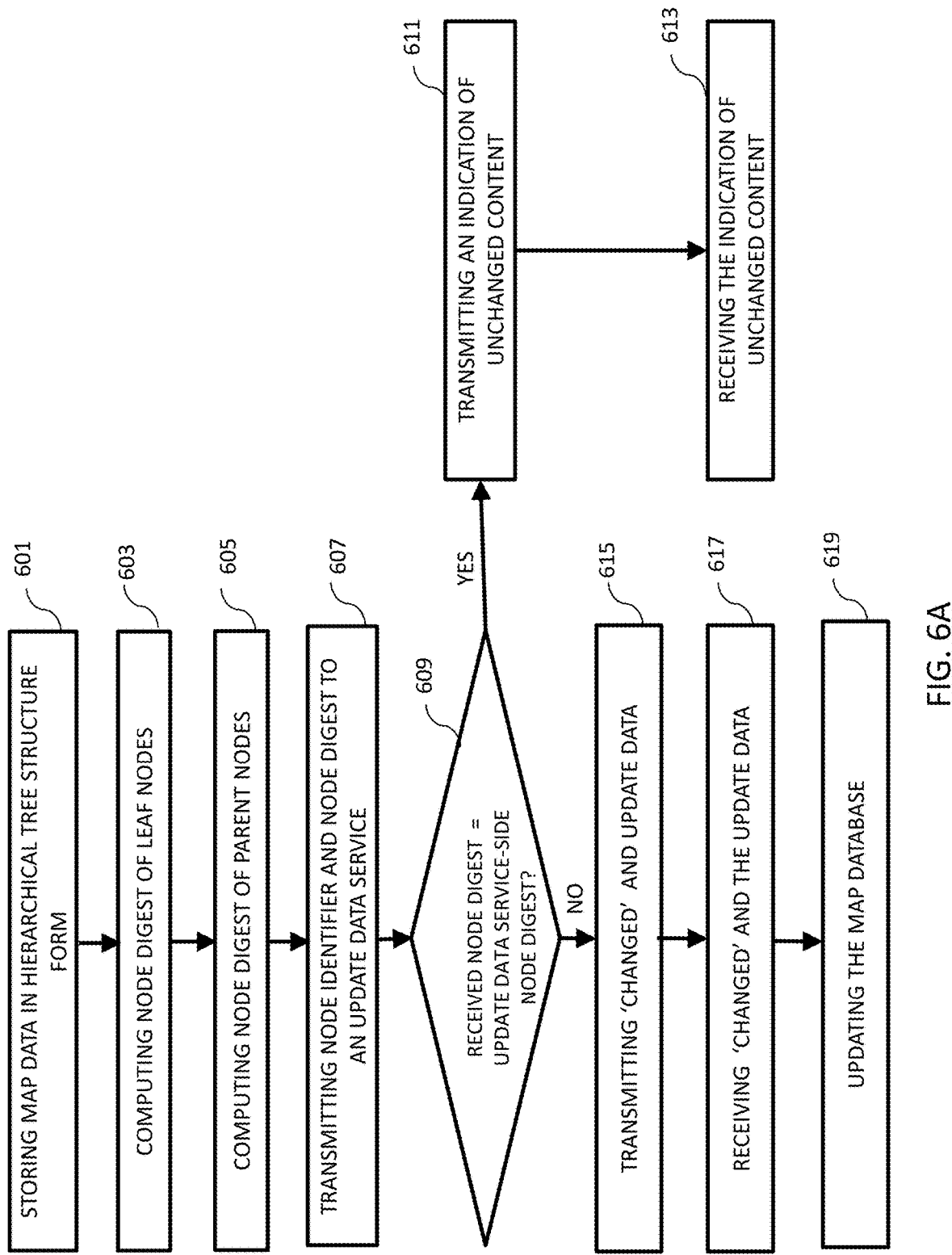

| NODE | UPDATE INDICATION | UPDATE DATA |
|---|---|---|
| D (PARENT NODE) | CHANGED | NODE DIGESTS OF CHILD NODES DA, DB, DC AND DD |
| DB (LEAF NODE) | CHANGED | NEW CONTENT OF NODE DB |

FIG. 6D

APPARATUS AND METHODS FOR GENERATING UPDATE DATA FOR A MAP DATABASE

TECHNOLOGICAL FIELD

Example embodiments generally relate to mapping and navigation applications. An example embodiment relates generally to generating update data for a map database for mapping and navigation applications.

BACKGROUND

Currently, various navigation applications are available to provide assistance (for example, directions) for driving, walking, or other modes of travel for a user. Generally, web-based systems and mobile app-based systems offer navigation applications that allow the user to request directions from one point to another. For this, a client/user vehicle retrieves a map between different locations, such as a source location and a destination location, for navigation based on map data stored in a client device. However, problems can occur when the map data stored by the client device is outdated. It may be particularly difficult or impossible for the client vehicles to safely and efficiently navigate if the outdated map data is used by the client vehicles. Further, in some scenarios the client vehicles utilizing this outdated map data for navigation may be prone to undesired navigational conditions and may lead to catastrophic events such as reporting a road sign related to some weight limitation (such as a road sign displaying a weight of 12 tons) as a speed limit value, like 120 KPH, or manifesting a route between two locations which no longer exists at present time.

BRIEF SUMMARY OF SOME EXAMPLE EMBODIMENTS

Accordingly, there is a need for an apparatus, a method and/or a computer program product that may provide for generating update data for updating the outdated map data stored in the client device. Various embodiments provide an apparatus, a method and computer program product for generating update data for a map database. The map database may include a cloud based backend system that contains the updated map data. The client device may retrieve the updated map data stored in the backend system to provide the updated map data for use in various scenarios, such as navigation applications.

According to a first aspect, a method for generating update data for a map database may be provided. The method may comprise: receiving a node identifier and a first node digest of an update candidate node; obtaining, based on the node identifier, a second node digest of the update candidate node; comparing the first node digest and the second node digest of the update candidate node; and generating, based on the comparison, the update data for the map database, the update data containing one of: an indication of unchanged content; node digests of the child nodes of the update candidate node; or updated content corresponding to the update candidate node.

According to some example embodiments, the method may further comprise transmitting the generated update data for the map database to a client.

According to some example embodiments, the update data for the map database contains an indication of unchanged content in case of match of the first node digest and the second node digest of the update candidate node.

According to some example embodiments, the update data for the map database contains node digests of child nodes of the update candidate node, if the update candidate node corresponds to a parental node and in case of mismatch of the first node digest and the second node digest of the update candidate node.

According to some example embodiments, the update data for the map database contains updated content corresponding to the update candidate node, if the update candidate node corresponds to a leaf node and in case of mismatch of the first node digest and the second node digest of the update candidate node.

According to some example embodiments, to obtain a second node digest of the update candidate node, the method may further comprise accessing a hierarchical tree structure, wherein a root node or an inner node comprises a parental node digest based on an eXclusive OR (XOR) function of the node digests of corresponding child nodes, and wherein a leaf node in the hierarchical tree structure comprises a leaf node digest based on the node identifier of the leaf node and map content associated with the node identifier of the leaf node.

According to some example embodiments, the method may further comprise, in response to a data service-side content update, recomputing the hierarchical tree structure based on the updated content.

According to some example embodiments, the method may further comprise associating the map area identifier to a map tile of a quad-tree map data structure, wherein tiles corresponding to quad-tree leaf nodes are data tiles.

According to some example embodiments, the method may further comprise associating the map area identifier to a map cube of an oct-tree map data structure, wherein cubes corresponding to oct-tree leaf nodes are data cubes.

According to another aspect, an apparatus for generating update data for a map database may be provided. The apparatus may include at least one memory configured to store computer executable instructions and at least one processor may be configured to execute the computer executable instructions to: receive a node identifier and a first node digest of an update candidate node; obtain, based on the node identifier, a second node digest of the update candidate node; compare the first node digest and the second node digest of the update candidate node; and generate, based on the comparison, the update data for the map database, the update data containing one of: an indication of unchanged content; node digests of the child nodes of the update candidate node; or updated content corresponding to the update candidate node.

According to some example embodiments, the apparatus may be further configured to transmit the generated update data for the map database to a client.

According to some example embodiments, the update data for the map database contains an indication of unchanged content in case of match of the first node digest and the second node digest of the update candidate node.

According to some example embodiments, the update data for the map database contains node digests of child nodes of the update candidate node, if the update candidate node corresponds to a parental node and in case of mismatch of the first node digest and the second node digest of the update candidate node.

According to some example embodiments, the update data for the map database contains updated content corresponding to the update candidate node, if the update candidate node corresponds to a leaf node and in case of mismatch of the first node digest and the second node digest of the update candidate node.

According to some example embodiments, to obtain a second node digest of the update candidate node, the apparatus may be further configured to access a hierarchical tree structure, wherein a root node or an inner node comprises a parental node digest based on an eXclusive OR (XOR) function of the node digests of corresponding child nodes, and wherein a leaf node in the hierarchical tree structure comprises a leaf node digest based on the node identifier of the leaf node and map content associated with the node identifier of the leaf node.

According to some example embodiments, the apparatus may be further configured to in response to a data service-side content update, recompute the hierarchical tree structure based on the updated content.

According to some example embodiments, the apparatus may be further configured to carry out the operations to associate the map area identifier to a map tile of a quad-tree map data structure, wherein tiles corresponding to quad-tree leaf nodes are data tiles.

According to some example embodiments, the apparatus may be further configured to carry out the operations to associate the map area identifier to a map cube of an oct-tree map data structure, wherein cubes corresponding to oct-tree leaf nodes are data cubes.

According to still another aspect, a computer program product is provided. The computer program product comprises a non-transitory computer-readable medium having stored thereon computer-executable instructions which when executed by one or more processors of an apparatus, cause the apparatus to carry out operations for updating the map database, the operations comprising: receiving a node identifier and a first node digest of an update candidate node; obtaining, based on the node identifier, a second node digest of the update candidate node; comparing the first node digest and the second node digest of the update candidate node; and generating, based on the comparison, the update data for the map database, the update data containing one of: an indication of unchanged content; node digests of the child nodes of the update candidate node; or updated content corresponding to the update candidate node.

According to some example embodiments, the operations may further comprise transmitting the generated update data for the map database to a client According to some example embodiments, the update data for the map database contains an indication of unchanged content in case of match of the first node digest and the second node digest of the update candidate node.

According to some example embodiments, the update data for the map database contains node digests of child nodes of the update candidate node, if the update candidate node corresponds to a parental node and in case of mismatch of the first node digest and the second node digest of the update candidate node.

According to some example embodiments, the update data for the map database contains updated content corresponding to the update candidate node, if the update candidate node corresponds to a leaf node and in case of mismatch of the first node digest and the second node digest of the update candidate node.

According to some example embodiments, to obtain a second node digest of the update candidate node, the apparatus may be further configured to carry out the operations to access a hierarchical tree structure, wherein a root node or an inner node comprises a parental node digest based on an eXclusive OR (XOR) function of the node digests of corresponding child nodes, and wherein a leaf node in the hierarchical tree structure comprises a leaf node digest based on the node identifier of the leaf node and map content associated with the node identifier of the leaf node.

According to some example embodiments, the apparatus may be further configured in response to a data service-side content update, recompute the hierarchical tree structure based on the updated content.

According to some example embodiments, the apparatus may be further configured to carry out the operations to associate the map area identifier to a map tile of a quad-tree map data structure, wherein tiles corresponding to quad-tree leaf nodes are data tiles.

According to some example embodiments, the apparatus may be further configured to carry out the operations to associate the map area identifier to a map cube of an oct-tree map data structure, wherein cubes corresponding to oct-tree leaf nodes are data cubes.

BRIEF DESCRIPTION OF THE DRAWINGS

Figure 1:
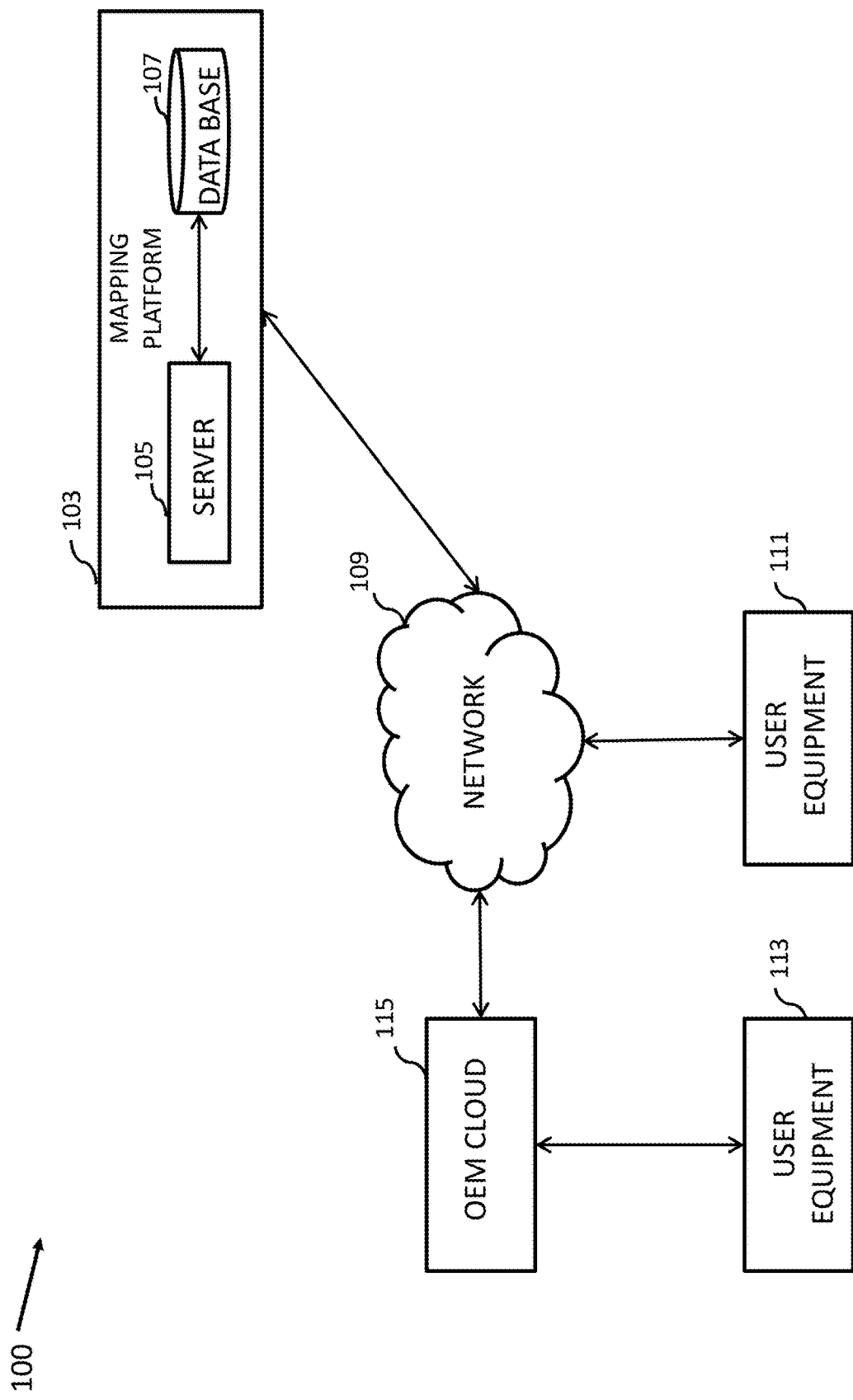
Figure 3:
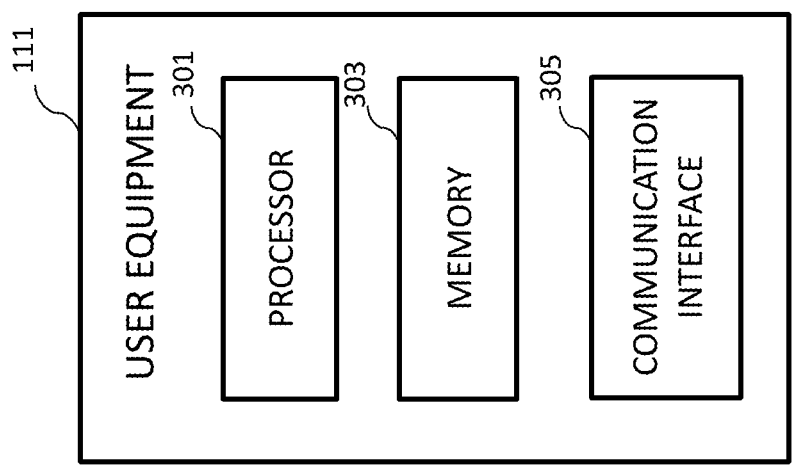
Figure 2:
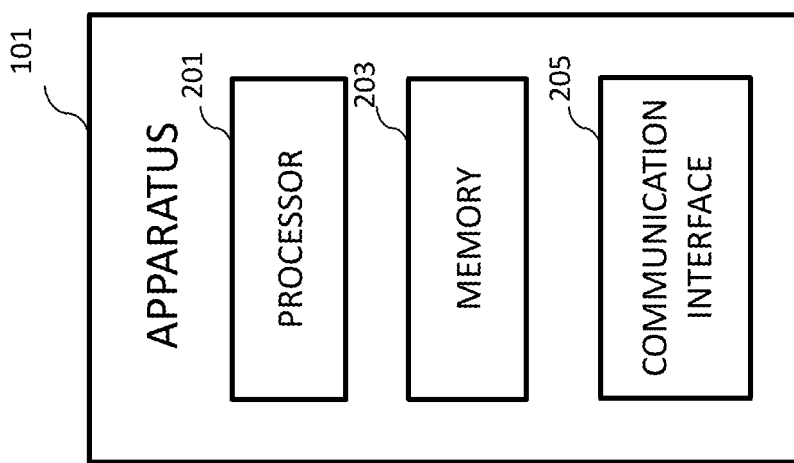
Figure 4:
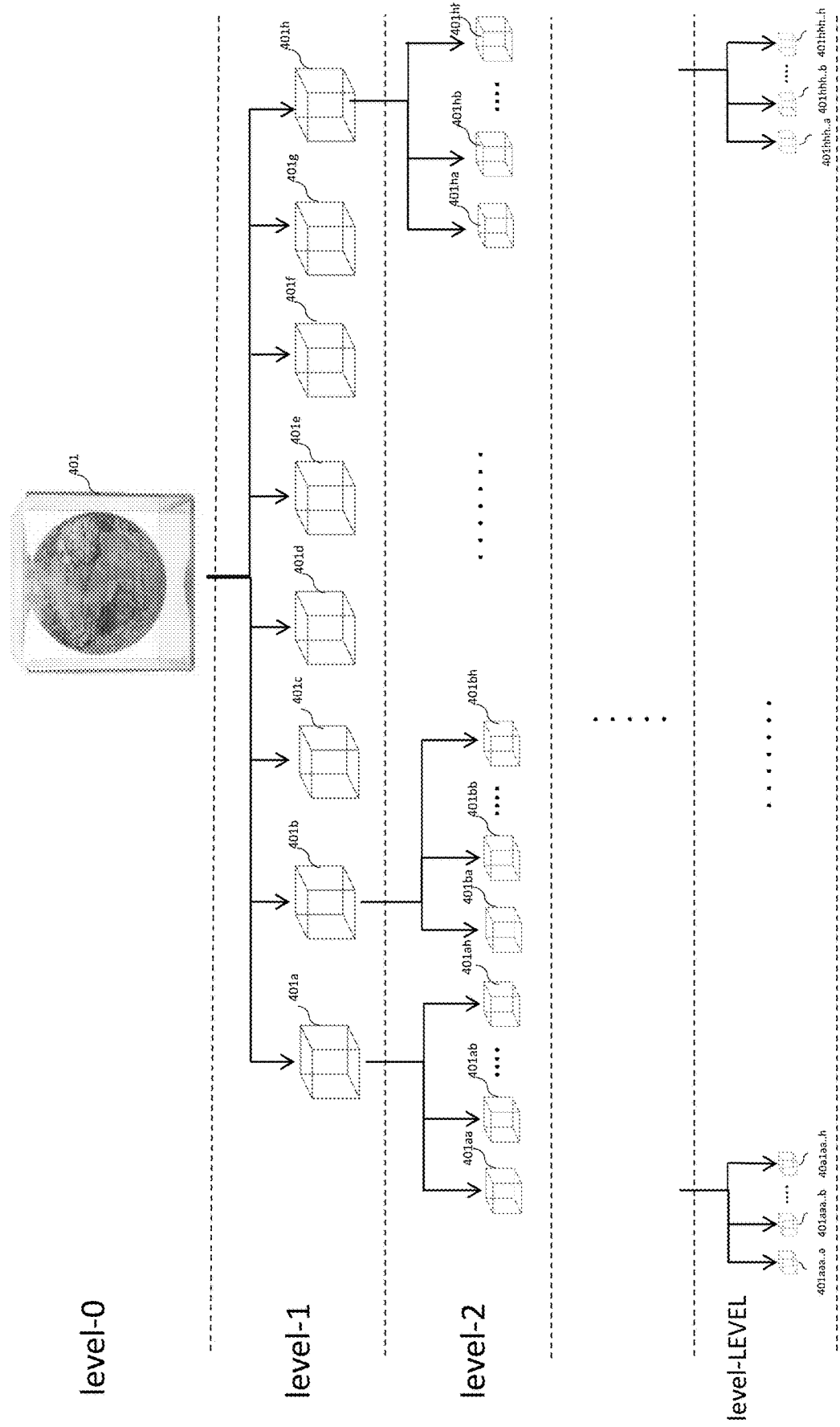
Figure 5:
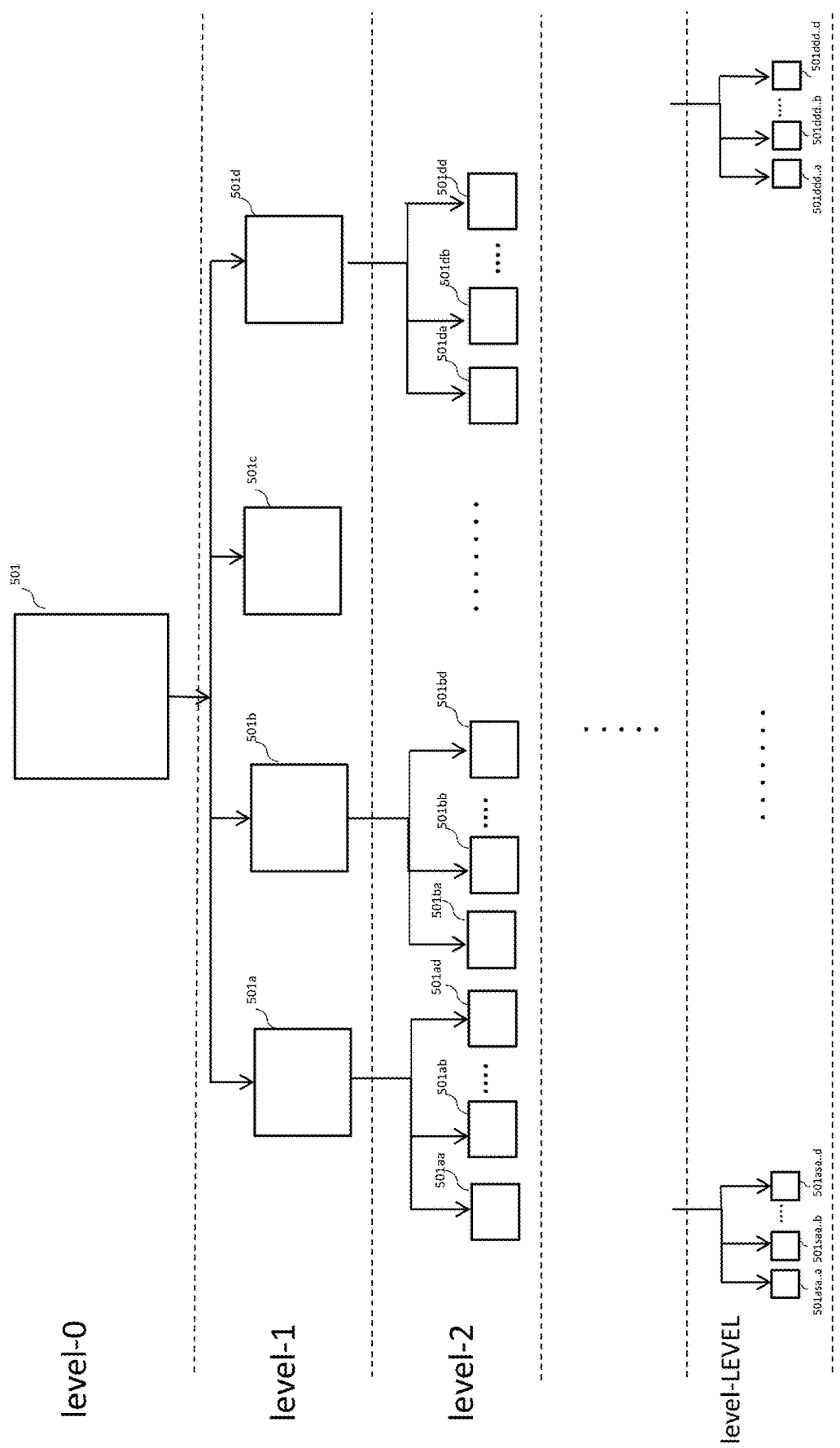

Having thus described example embodiments of the invention in general terms, reference will now be made to the accompanying drawings, which are not necessarily drawn to scale, and wherein:

FIG. 1 is a block diagram that illustrates a network environment of a system for generating update data for a map database, in accordance with an example embodiment;

FIG. 2 is a block diagram that exemplarily illustrates a system for generating update data for the map database, in accordance with an example embodiment;

FIG. 3 is a block diagram that exemplarily illustrates a user equipment for generating update data for the map database, in accordance with an example embodiment;

FIG. 4 illustrates hierarchical tree structure of 3D map data, in accordance with an example embodiment;

FIG. 5 illustrates hierarchical tree structure of 2D map data, in accordance with an example embodiment.

Figure 6B:
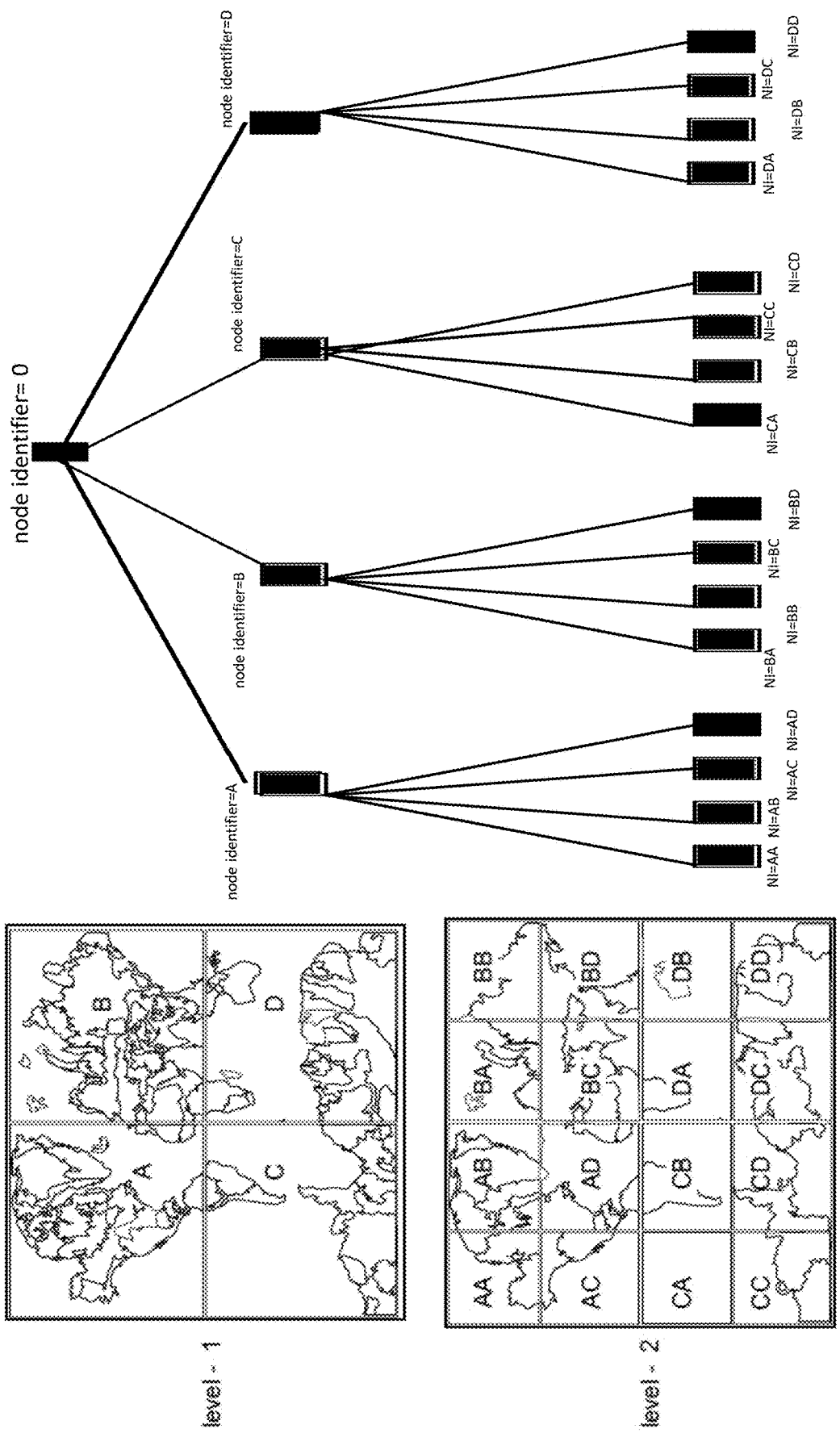
Figure 6C:
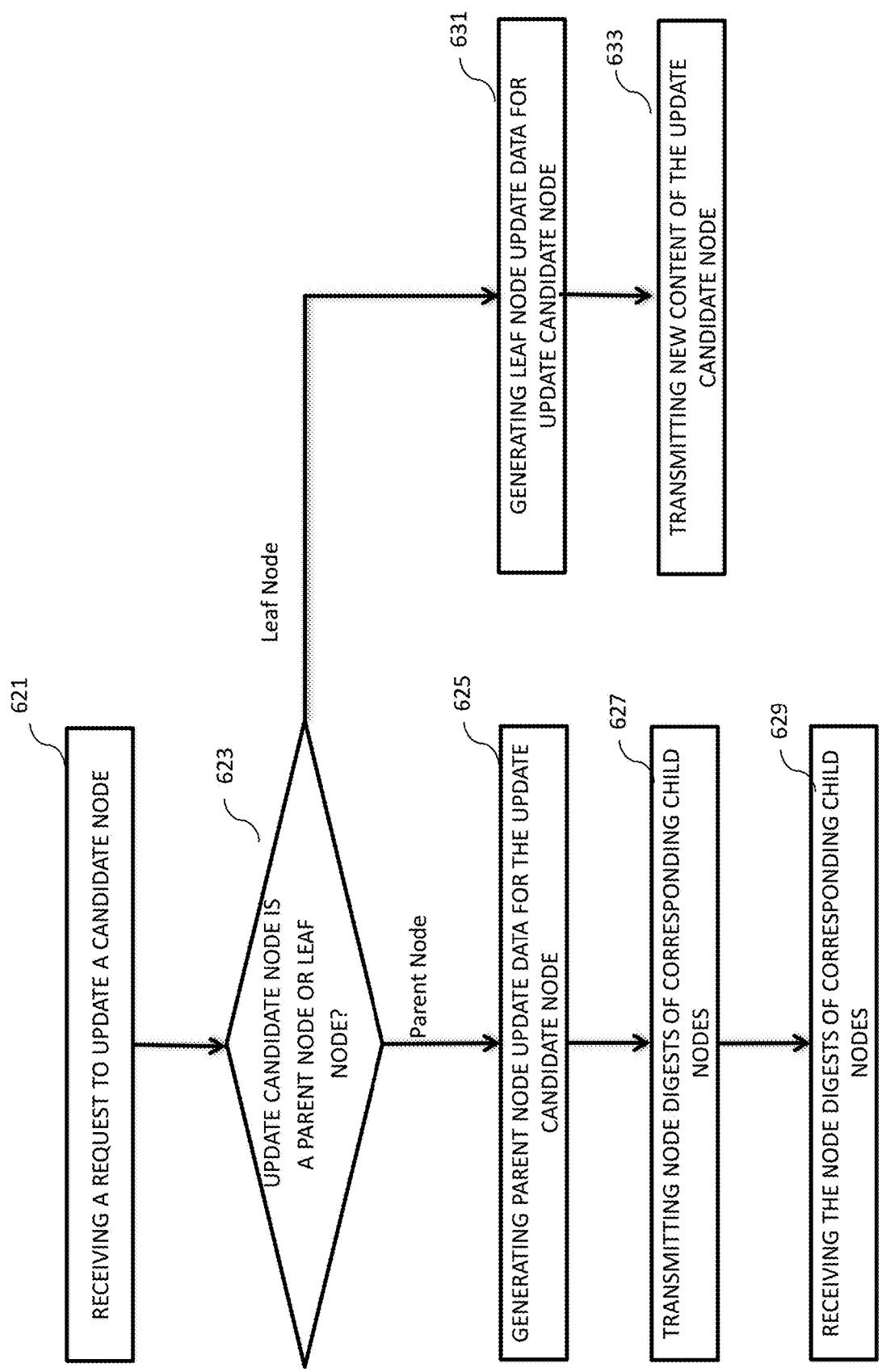
Figure 7:
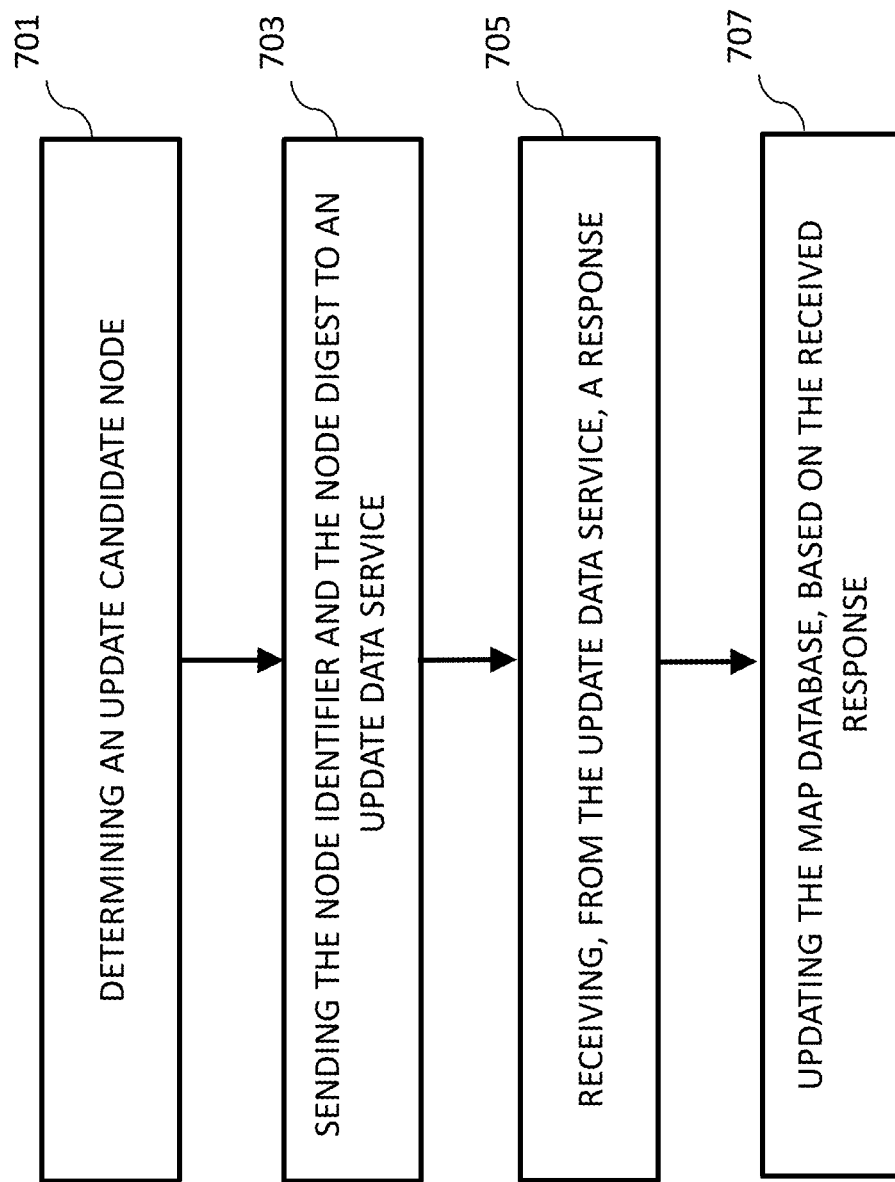
Figure 8:
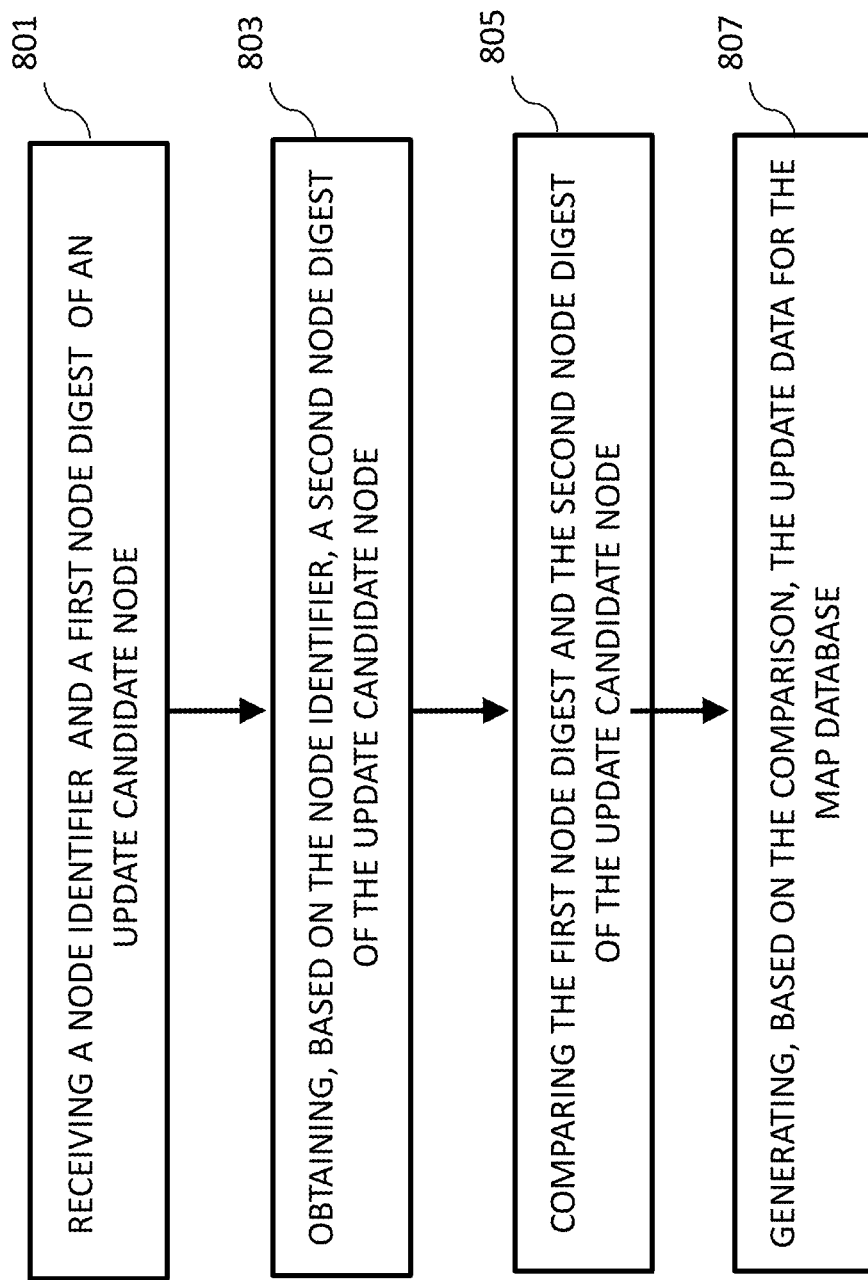

FIG. 6A illustrates a flowchart illustrating operations performed for implementation of an exemplary method to update the map database, in accordance with an example embodiment;

FIG. 6B illustrates a block diagram of an exemplary hierarchical tree data structure used in the methods and apparatuses for generating update data for the map database, in accordance with an example embodiment;

FIG. 6C illustrates a flowchart illustrating operations performed for implementation of another exemplary method to generate update data for the map database, in accordance with an example embodiment;

FIG. 6D illustrates a table illustrating update operations performed for implementing a method to generate update data for the map database, in accordance with an example embodiment;

FIG. 7 illustrates a flowchart for implementation of an exemplary method to update the map database, in accordance with an example embodiment; and FIG. 8 illustrates a flowchart for implementation of an exemplary method to generate update data for a map database, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention. Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example." "For instance." and "such as, and the verbs "comprising," "having." "including." and their other verb forms, when used in conjunction with a listing of one or more components or other items, are each to be construed as open ended, meaning that that the listing is not to be considered as excluding other, additional components or items. The term "based on" means at least partially based. As used herein, the terms "first" and "second" are not intended to represent any particular order or arrangement of elements. Instead, these terms are used herein to indicate that an element is different from another element. Other terms are to be construed using their broadest reasonable meaning unless they are used in a context that requires a different interpretation.

I. General Overview

There is a need for a system and a method to generate update data for outdated map data in a client device. The apparatus, the method, and a computer program product provided herein are directed towards generating update data for a map database and thus update the outdated map data based on the generated update data. The generated update data may be considered to be a representation of the update state of the map database. Further, the apparatus, the method, and the computer program product provided herein efficiently synchronize map data between the client device and a server that contains updated map data. In some example embodiments, empty portions of map data of a region do not consume any storage space in the client system and don't need to be updated. Thus, various embodiments provide for operating on portions of the map data of the region in the client system where the map data exists. Consequently, response time of an application using the map data update operation, such as a navigation application, is optimized. Further, various embodiments also provide for storing the map data in a hierarchical tree structure type of data structure. Subsequently, the hierarchical tree data structure forms a quad tree (or an oct-tree) where data tiles (or data cubes) form leaves and parent tiles (or parent cubes) form inner nodes respectively of the quad tree (or oct-tree). As a result of this, when a data tile (or a data cube) is updated, all hash values along a path from level of the data tile (or of the data cube) to root of the data tile (or of the data cube) are affected and hash values of other tiles in other levels remain unaffected. Therefore, the system, the method, and the computer program product provided in accordance with various embodiments disclosed herein provide an efficient protocol to update map data of the region without affecting map data of other regions. Further, the system, the method, and the computer program product provided herein minimize the payload to save bandwidth and optimize response time in various applications.

FIG. 1 is a block diagram that illustrates a network environment 100 of a system for updating a map database, in accordance with an example embodiment. The network environment 100 may include a mapping platform 103, a network 109, user equipment 111, 113 and an OEM cloud 115. The mapping platform 103 may include a server 105 and a database 107. The server 105 and the database 107 may be communicatively coupled to each other. Further, the mapping platform may be communicatively coupled to the user equipment 111, 113 directly or indirectly, via the network 109. The user equipment 113 may be communicatively connected to the OEM cloud 115 which in turn may be accessible to the mapping platform 103 via the network 109. The user equipment 111 may be communicatively coupled to the mapping platform 103 directly, via the network 107.

All the components in the network environment 100 may be coupled directly or indirectly to the network 109. The components described in the network environment 100 may be further broken down into more than one component and/or combined together in any suitable arrangement. Further, one or more components may be rearranged, changed, added, and/or removed.

The mapping platform may comprise suitable logic, circuitry, interfaces and code that may be configured to obtain map update data of the region. The server 105 may comprise processing means and communication means. For example, the processing means may comprise one or more processors configured to process requests received from the user equipments 111, 113. The processing means may fetch map data from the database 107 and transmit the same to the user equipments 111, 113 in a format suitable for use by the user equipments 111, 113. In one or more example embodiments, the mapping platform 103 may periodically communicate with the user equipments 111, 113 via the processing means to update a local cache of the map data stored on the user equipments 111, 113. Accordingly, in some example embodiments, the map data may also be stored on the user equipments 111, 113 and may be updated based on periodic communication with the mapping platform 101.

The mapping platform 103 may comprise the database 107 for storing the map data and the server 105. The server 105 and the database 107 may be together referred to as an update data service. The database 107 may store node data, road segment data, link data, point of interest (POI) data, link identification information, heading value records or the like. The database 107 may also store cartographic data, routing data, and/or manoeuvring data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 107 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fuelling stations, hotels, restaurants, museums, stadiums, offices, auto repair shops, buildings, stores, parks, etc. The database 107 may also store data about the POIs and their respective locations in the POI records. The database 107 may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the database 107 can include event data (e.g., traffic incidents, construction activities, scheduled events, unscheduled events, accidents, diversions etc.) associated with the POI data records or other records of the database 107. Optionally or additionally, the database 107 may store 3D building maps data (3D map model of objects) of structures surrounding roads and streets.

The database 107 may be maintained by a content provider e.g., a map developer. By way of example, the map developer may collect geographic data to generate and enhance the database 107. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning as described herein.

The database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipments 111, 113. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

The network 109 may be wired, wireless, or any combination of wired and wireless communication networks, such as cellular, Wi-Fi, interne, local area networks, or the like. In one embodiment, the network 109 may include one or more networks such as a data network, a wireless network, a telephony network, or any combination thereof. It is contemplated that the data network may be any local area network (LAN), Personal Area Network (PAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fibre-optic network, and the like, or any combination thereof. In addition, the wireless network may be, for example, a cellular network and employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, ITU-IMT 2020 networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET). In some embodiments, the network 109 may comprise the automotive cloud, digital transportation infrastructure (DTI), radio data system (RDS)/high definition (HD) radio or other digital radio system, and/or the like. For example, the user equipments 111, 113 may be in communication with a network apparatus via the network 109. For example, the user equipment 113 may communicate with the network apparatus via a network, such as the Cloud. For example, the Cloud may be a computer network, such as the OEM cloud 115 that provides shared computer processing resources and data to computers and other devices connected thereto In accordance with an embodiment, the mapping platform 103 may retrieve the map data directly from the user equipments 111, 113 with connected communications capabilities (e.g., cellular or other wireless communications equipped vehicles) or from the Original Equipment Manufacturer (OEM) cloud. The OEM cloud 115 may be operating an OEM platform (e.g., a services platform) that collects the map data from the user equipment 113. The retrieval of the map data may occur in real-time or near real-time, continuously, periodically, according to a schedule or on demand.

The user equipments 111, 113 may be any user accessible device such as a mobile phone, a smartphone, a portable computer, and the like that is portable in itself or as a part of another portable/mobile object such as a vehicle. In some example embodiments, the user equipments 111, 113 may be vehicles itself. Further, the use equipments 111, 113 may be referred to as client devices. In an example embodiment, the user equipments 111 and 113 may comprise a processor, memory, a communications interface as illustrated later in conjunction with FIG. 3. The user equipments 111 and 113 may further comprise, a user interface, one or more sensors (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the user equipments 111 and 113 to determine the location enable the user equipments 111 and 113 and/or one or more features of the corresponding vehicle's surroundings and/or monitor the vehicle's operating parameters), and/or other components configured to perform various operations, procedures, functions or the like described herein. In various embodiments, each of user equipments 111 and 113 may store a mobile version of a digital map (e.g., in memory). In at least some example embodiments, the memory may be non-transitory, and may use the map to retrieve updated map from a map database.

II. Example Apparatus

FIG. 2 is a block diagram that exemplarily illustrates an apparatus for updating the map database, such as the database 107, in accordance with an example embodiment. The apparatus 101 may comprise a processor 201, a memory 203 and a communication interface 205. The processor 201, the memory 203 and the communication interface 205 may be communicatively coupled to each other. The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 304a may include one or more processors configured in tandem via the bus to enable independent execution of instructions, pipelining and/or multithreading. In some embodiments, the apparatus may be embodied as part of the mapping platform.

The memory 203 may be non-transitory and may include, for example, one or more volatile and/or non-volatile memories. For example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 could be configured to buffer input data for processing by the processor 201. Additionally, or alternatively, the memory 203 could be configured to store instructions for execution by the processor 201.

The processor 201 (and/or co-processors or any other processing circuitry assisting or otherwise associated with the processor 201) may be in communication with the memory 203 via a bus for passing information among components of the server 105 and thus the user equipments 111, 113. The processor 201 may be configured to execute instructions stored in the memory 203 or otherwise accessible to the processor 201. Additionally, or alternatively, the processor 201 may be configured to execute hard coded functionality. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. The processor 201 may include, among other things, a clock, an arithmetic logic unit (ALU) and logic gates configured to support operation of the server 105.

The communication interface 205 may comprise input interface and output interface for supporting communications to and from the user equipments 111, 113. The communication interface 205 may be any means such as a device or circuitry embodied in either hardware or a combination of hardware and software that is configured to receive and/or transmit data to/from a communications device in communication with the user equipments 111, 113. In this regard, the communication interface 205 may include, for example, an antenna (or multiple antennae) and supporting hardware and/or software for enabling communications with a wireless communication network. Additionally or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

FIG. 3 is a block diagram that exemplarily illustrates the user equipment 111 of the network environment 100 for updating the map database, in accordance with an example embodiment. The user equipment 111 may comprise a processor 301, a memory 303 and a communication interface 305. The processor 301, the memory 303 and the communication interface 305 may be communicatively coupled to each other. In some example embodiments, the processor 301, the memory 303 and the communication interface 305 may be same as the processor 201, the memory 203 and the communication interface 205, respectively, described in FIG. 2. The user equipment 111 may also be referred to as a client device. In some example embodiments, the user equipment 111 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In this context, the user may be an autonomous or semi-autonomous vehicle. The user equipment 111 may comprise processing means such as a central processing unit (CPU), storage means such as on board read only memory (ROM) and random access memory (RAM), acoustic sensors such as a microphone array, position sensors such as a GPS sensor, orientation sensors such as gyroscope, motion sensors such as accelerometer, a display enabled user interface such as a touch screen display, and other components as may be required for specific functionalities of the user equipment 111. Additional, different, or fewer components may be provided. For example, the user equipment 111 may be configured to execute and run mobile applications such as a messaging application, a browser application, a navigation application, and the like. In some example embodiments, the user equipment 113 may be same as the user equipment 111 described above.

III. Example Operation

FIG. 4 illustrates a hierarchical tree data structure of 3D map data, in accordance with an example embodiment. The 3D map data in the hierarchical tree structure may be stored in one or more levels. The one or more levels may correspond to level-0 to level LEVEL. The level-0 may correspond to lowest level of the one or more levels and level LEVEL may correspond to highest level of the one or more levels. In some example embodiments, map data in each level of level-0 to level LEVEL may be partitioned into 3D shapes, such as but not limited to cubes, tetrahedrons or cuboids. In the present disclosure, for the ease of describing example embodiments, the cubes are considered. The cubes may be referred to as nodes. The 3D map data at the level-0 may correspond to whole earth map data. For example, consider a cube of length 16000 km and each location in the cube may be represented by (x, y, z) coordinates. Earth of radius 6371 km may be centred at the centre of the cube i.e. at coordinates (8000 km, 8000 km, 8000 km). The cube may further include approximately 1500 km of earth's atmosphere. The cube may be referred to as earth-cube. Node 401 may correspond to the earth-cube in accordance with the example.

The node 401 may be referred to as root node. The node 401 may be divided into eight equal sized sub-cubes 401a to 401h i.e. the 3D map data in the cube 401 is divided into eight equal sized sub-cubes. In some example embodiments, the node 401 may be divided into more than eight sub-cubes, such as but not limited to 64, 512 or 4096. The nodes 401a to 401h may be referred to as level-1 nodes. Further, each node of the nodes 401a to 401h may be divided into eight equal sized sub-cubes. The nodes 401aa to 401ah may correspond to sub-cubes of the node 401a, the nodes 401ba to 401bh may correspond to sub-cubes of the nodes 401b and similarly the nodes 401ha to 401hh may correspond to sub-cubes of node 401h. The nodes 401aa to 401ah, 401ba to 401bh and similar nodes till the nodes 401ha to 401hh may be referred to as level-2 nodes.

Further, one or more nodes of the level-2 nodes may be divided into equal sized sub-cubes. The sub-cubes of the one or more nodes of the level-2 nodes may correspond to level-3 nodes (not shown in the FIG. 4). Nodes 401aaa . . . a to 401aaa . . . h may correspond to sub-cubes of one of a node of level-{LEVEL-1}. Similarly, nodes 401hhh . . . a to 401hhh . . . h may correspond to sub-cubes of one of a node of level-{LEVEL-1}. The nodes 401aaa . . . a to 401aaa . . . h and similar nodes till the nodes 401hhh . . . a to 401hhh . . . h may be nodes of level LEVEL. The level LEVEL may be the highest level of the one or more levels and may not contain sub-cubes i.e. the nodes of the level LEVEL are not divided into sub-cubes.

The nodes at level-0 to level-{LEVEL-1} may be referred to as parent nodes. Each parent node may comprise child nodes. For example, the node 401 is a parent node and the sub-cubes 401a to 401h are the child nodes of the node 401. Similarly, the nodes 401a to 401h may be the parent nodes and respective sub-cubes may be child nodes. In other words, the child nodes may be contemplated as subset of the parent nodes. The hierarchical tree data structure of 3D map data may also be represented as an oct-tree structure. In some embodiments, the nodes at level LEVEL may be referred to as oct-tree leaf nodes. The cubes corresponding to the oct-tree leaf nodes are data cubes. The leaf nodes contain the map data content. Each node at level 0 to level LEVEL may be associated with identity data which is referred to as node identifier. The node identifier of each node may also be referred to as CUBE-ID. The node identifier of each node may be defined by respective center x, y, z coordinates and level of each node, which implies that node identifier of a node depends on the level of the node. Thus, from the node identifier of a node, the level of the node may be known.

FIG. 5 illustrates hierarchical tree structure of 2D map data, in accordance with an example embodiment. The 2D map data in the hierarchical tree structure may be stored in one or more levels. The one or more levels may correspond to level-0 to level LEVEL. The 2D map data in each level of level-0 to level LEVEL may be partitioned into tiles. The tiles may refer to 2D shapes, such as but not limited to squares, equilateral triangles, rectangles or tessellations.

In the present disclosure, for the ease of describing example embodiments, the squares are considered. The tiles may be referred to as nodes. The node 501 may be referred to as root node. The node 501 may be divided into four equal sized sub-tiles nodes 501*a* to 501*d*. Further, each node of the nodes 501*a* to 501*d* may be divided into four equal sized sub-tiles. The nodes 501*aa* to 501*ad* may correspond to sub-tiles of the node 501*a*, the nodes 501*ba* to 501*bd* may correspond to sub-nodes of the node 501*b* and similarly the nodes 501*da* to 501*dd* may correspond to sub-tiles of node 501*d*. Nodes 501*aa* . . . *a* to 501*aa* . . . *d* may correspond to sub-tiles of one of a tile of level-{LEVEL-1}. Similarly, nodes 501*dd* . . . *a* to 501*dd* . . . *d* may correspond to sub-tiles of one of a tile of level-{LEVEL-1}. The nodes 501*aaa* . . . *a* to 501*aaa* . . . *d* and similar nodes till the nodes 501*ddd* . . . *a* to 501*ddd* . . . *d* may correspond to nodes of level LEVEL. The level LEVEL may be the highest level of the one or more levels and may not contain sub-tiles i.e. the nodes of the level LEVEL are not divided into sub-tiles.

Similar to the above description of the hierarchical tree structure of 3D map data with reference to the FIG. 4, the nodes at level-0 to level-{LEVEL-1}, as illustrated in FIG. 5, may be referred to as the parent nodes. Each parent node may comprise child nodes. For example, the node 501 is a parent node and the nodes 501*a* to 501*d* are child nodes of the node 501. Similarly, the nodes 501*a* to 501*d* may be the parent nodes and respective sub-tiles may be child nodes. The hierarchical tree structure of 2D map data may also be referred to as quad-tree structure. In some embodiments, the nodes at level LEVEL may be referred to as quad-tree leaf nodes. The tiles corresponding to the quad-tree leaf nodes are data tiles. The leaf nodes contain the map data content. Each node at level 0 to level LEVEL may be associated with identity data which is referred to as node identifier. The node identifier of each node may also be referred to as tileID.

FIG. 6A illustrates flowchart illustrating operations performed for implementation of an exemplary method to update map database, in accordance with an example embodiment. The FIG. 6A is described in conjunction with elements from FIG. 1.

At block 601, the method may include storing the map data in hierarchical tree structure (also interchangeable referred to as hierarchical tree data structure hereinafter). FIG. 6B illustrates a block diagram of an exemplary hierarchical tree data structure used in the methods and apparatuses for updating a map database, in accordance with an example embodiment. The FIG. 6B shows an example of hierarchical tree data structure for map data at level 2. Each tile of the hierarchical tree structure may be referred to as node. Each node is associated with a node identifier. The level 0 (not shown in FIG. 6B) of the hierarchal tree structure consists a tile that corresponds to whole earth 2D map data without partitions. The tile of level 0 may be divided into four tiles, namely, nodes A B, C, and D. The nodes A B, C, and D may be referred to as inner nodes or parent nodes. Further, each node of the nodes A B, C, and D is divided into four tiles. The four tiles of each node of the nodes A B, C, and D may be referred to as child nodes of respective node. For example, nodes AA, AB, AC and AD are child nodes of node A. The tiles at level 2 may be referred to as leaf nodes. The tiles corresponding to the leaf nodes may be data tiles. The leaf nodes may contain the map data.

At block 603, the method may include computing node digest of leaf nodes. The node digest may correspond to a hash value. A hash function with robust collision-resistance, may be used in computing the node digest of the leaf nodes. The hash function which generates a 64 bit or higher hash value, such as but not limited to, MD5, MD6, SHA, HAVAL, SWIFFT, ECOH, MuHASH or RIPEMD may be utilized in computing the node digest. The hash value size may be chosen to lower the likelihood of node digests colliding. The node digest of the leaf node may be computed by hashing respective node identifier and content of the leaf node. For example, H (AA)=HASH (AA, content (AA)). The node identifier is included in computing the node digest of each leaf node to generate different node digests even if two leaf nodes contain same content. The leaf nodes at level 2 may include empty leaf nodes. The empty leaf nodes may correspond to tiles that contain no data. The node digest of the empty leaf nodes may be predefined and/or correspond to zero. For example, data about water bodies such as ocean, sea, desert and the like may correspond to empty nodes. As such map data, which includes data about road links, segments, shapes, curvatures and the like, cannot and/or does not exist for the water bodies (with the exception of bridges, underwater tunnels, and the like). Thus, this data for water bodies may correspond to zero or a predefined value, such as null. Consequently, the empty leaf nodes do not have to be explicitly stored. However, in cases where bridges or tunnels exist over or under the water bodies, the map data exists and the node digest may not correspond to zero. Consequently, such map data is explicitly stored.

At block 605, the method may include computing node digest of parent nodes. Prior to computing the node digest of parent node, node digests of each child node of each parent node may be determined. In some example embodiments, the hashing function used for determining the node digests of the child node and the leaf node may be same. In some example embodiment, the hashing function used for the leaf node and the child node may be different. The node digest of the child node may be computed by hashing the associated node identifier. An eXclusive OR (XOR) function may be used to compute the node digest of the parent node. Embodiments described herein employ an XOR function or XOR logic gate. The XOR function is a logic gate that gives a "true" output when the number of true inputs is odd. The XOR function, sometimes called the "Exclusive OR", provides a "true" output if one and only one of the inputs to the function is true. The XOR function represents an inequality function where the output is true if the inputs are not alike, otherwise the output is false. XOR provides a true output when for a logic issue where one or the other of two inputs is true, but not both. An n-bit XOR function is made from n gates. Bit-wise XOR involves where corresponding bits from two identifiers (e.g., 6-bit identifiers) are logically XOR'd to form a corresponding bit in a third identifier. An example may include 6-bit identifiers including identifier A=011101 and identifier B=001011. The XOR identifier applied to identifiers A and B would result in identifier C=010110, where a zero is present when the XOR is false (bits are equal) and a one is present where the XOR is true (bits are not equal).

According to example embodiments described herein, XOR(x_1, . . . , x_n) denotes the sequentially applied bitwise XOR function, otherwise represented as x_1 XOR . . . XOR x_n. The XOR function is associative with the possibility of arbitrary grouping. As an example: If z=x XOR y, then x XOR (y XOR z)=(x XOR y) XOR. In some embodiments, the node digest of the parent node may be computed by XORing the node digests of corresponding child nodes. For example, H(A)=(H(AA)⊕H(AB)⊕H(AC)⊕H(AD)), wherein AA, AB, AC and AD are the node identifiers of the child nodes of the parent node A. The parent nodes may include empty parent nodes. The empty parent nodes may correspond to nodes that contain empty child nodes. For example, as discussed above, if a child node represents a water body, such as if child nodes with identifiers AA, AB, AC, and AD belong to a water body, like sea, then node digests H(AA), H(AB), H(AC), and H(AD) may correspond to zero. Thus, the parent node A, which will also correspond to a portion of water body, will also correspond to zero. Thus, in this manner, the node digest of the empty parent nodes may be predefined and/or correspond to zero. Thus, the empty parent nodes do not have to be explicitly stored.

At block 607, the method may include transmitting node identifier and node digest of an update candidate node, to update data service. The update candidate node may refer to a node that is checked for map data updating. The update data service may include the server 105 with the database 107. The database 107 may contain updated map data and corresponding node digests and node identifiers. The node digests in the database 107 may be referred to as update data service-side node digests. The server 105 may retrieve, from the database 107, the node digest corresponding to the received node identifier of the update candidate node. At block 609, the method may include comparing, by the system 101, the received node digest with the corresponding update data service-side node digest. Further, the apparatus 101 may generate the update data for the map database based on the comparison. In some example embodiments, the server 105 may compare the received node digest with the corresponding update data service-side node digest of the update candidate node and generate the update data for the map database based on the comparison. In some example embodiments, in case the content of the data service-side is updated, the server 105 may recompute the hierarchical tree structure based on the updated content, thereby maintaining the hierarchical tree structure up to date with respect to the content available to the data service.

If the received node digest and corresponding update data service-side node digest of the update candidate node are same, then at block 609, the method may include generating an indication of unchanged content. At block 611, the method may include transmitting the indication of unchanged content to the user equipment 111. The indication of unchanged content may include indication 'NOT CHANGED'. In some embodiments, an indication of unchanged content may be implicit in a reply to the user equipment 111 that does not content update content. At block 613, the method may include receiving the indication of unchanged from the update data service. The indication 'NOT CHANGED' signifies that the update candidate node at the user equipment 111 contains updated map data.

At block 609, the method may further include, generating an update indication 'CHANGED' and update data corresponding to the update candidate node, if the received node digest and the corresponding update data service-side node digest of the update candidate node are not same.

FIG. 6C illustrates a flowchart illustrating operations performed for implementation of another exemplary method to update the map database, in accordance with an example embodiment. At block 621, the method may include receiving a request to update a candidate node. At block 623, the method may include determining if the update candidate node is a leaf node. If the update candidate node is not a leaf node, then it signifies that the update candidate node is a parent node. Further, at block 625, the method may include generating parent node update data of the update candidate node, wherein the parent node update data may contain node digests of corresponding child nodes at the update data service-side. Subsequently, at block 627, the method may include transmitting the node digests of the corresponding child nodes to the user equipment 111. At block 629, the method may include receiving the node digests of the corresponding child nodes. In response to receiving the node digests of the corresponding child nodes, at block 629, the method may further include comparing the received node digests of child nodes with the corresponding child nodes at the user equipment 111. In case of mismatch between the node digests of compared child nodes, the method may include, transmitting the node digest and the node identifier of at least one mismatched child node to the update data service. Further, if the node digests of compared child nodes are matched, then it indicates that the child nodes at the user equipment 111 contain updated map data. At block 631, the method may include generating leaf node update data if the update candidate node is a leaf node, wherein the leaf node map update data may include new content of the update candidate node. Subsequently, at block 633, the method may include transmitting the new content of the update candidate node to the user equipment 111.

For example, consider the node D (shown in FIG. 6B) as the update candidate node. Assume no map data changes in Southern Africa i.e. the node DA, map data change in Australia i.e. the node DB, and map data of Antarctica is empty i.e. node digest of node DC and DD is zero respectively. The node digest and node identifier of node D may be sent to the update data service. As the node D is at the level-1, the node corresponds to parent node. The update data service may generate and subsequently transmit, to the user equipment 111, the parent node update data if the received node digest and the corresponding node digest at the update data service-side are not same. The parent cube map update data may comprise node digests of the child nodes of the node D i.e. node digests of the nodes DA, DB, DC, and DD. Consequently, the user equipment 111 may compare the received node digests of the child nodes with the corresponding node digests of the child nodes at the user equipment 111. Since it is assumed that the node digest of nodes DC and DD is zero and no map data changes in the node DA, only the received node digest of the node DB and the node digest of the node DB at the user equipment 111 results in mismatch. Therefore, the user equipment 111 may transmit the node identifier and the node digest of the node DB to the update data service. As the node DB is at level-2, the node DB is a leaf node. Subsequently, the update data service may transmit, to the user equipment 111, leaf node update data of node DB comprising new content of the node DB. FIG. 6D illustrates a table illustrating update operations performed for implementing a method to update the map database, in accordance with an example embodiment. The update operations may include updating the node digests of changed child nodes if the node is a parent node. The table also illustrates that the update operation may include updating the content of a node if that node is a child node and its content is changed. The change status of a node may be transmitted to the user at block 615 of the method illustrated in FIG. 6A.

In FIG. 6A, at block 615, the method may include transmitting, to the user equipment 111, update indication 'CHANGED' and the update data corresponding to the update candidate node. At block 617, the method may include receiving the update indication 'CHANGED' and the update data. In some embodiments, the update indication 'CHANGED' may be implicitly communicated by the act of sending update data corresponding to the update candidate node. At block 619, the method may include updating the map data based on the received update data. As a result of the hierarchical tree structure, if a leaf node is updated, all hash values along a path from level of the leaf node to root of the leaf node are affected and hash values of other cubes in other levels remain unaffected. For instance, considering the example disclosed above, the user equipment 111 may receive the leaf node update data of the node DA comprising new content of the node DA. Subsequently, the user equipment 111 may update the node DA based on the received leaf node update data. As the node digest of a leaf node depends on its content, when the node DA is updated corresponding node digest changes as well. Consequently, the node digest of the corresponding parent node i.e. node D also changes, as the hash value the parent node D depends on its child nodes. Therefore, the hierarchical tree structure may be recomputed based on the received update data. Further, the whole 2D earth map data may be updated by exercising the method on each tile of the whole 2D earth map data.

The method described with reference to the FIGS. 6A-6D, is pertinent to the hierarchical tree structure of the 3D map data. The method may be carried out on each node of the one or more levels of the hierarchical tree structure of the 3D map data. Consequently, the whole 3D map data may be updated.

FIG. 7 illustrates a flowchart for implementation of an exemplary method to update the map database, in accordance with an example embodiment of the disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

At block 701, the method may include determining an update candidate node, wherein the update candidate node is associated with a node identifier and a first node digest. Further, at block 701, the method may include determining a hierarchical tree structure, wherein a root node or an inner node comprises a parental node digest based on an eXclusive OR (XOR) function of the node digests of their corresponding child nodes, and wherein a leaf node comprises a leaf node digest based on the node identifier of the leaf node and map content associated with the node identifier of the leaf node.

At block 703, the method may include sending the node identifier and the node digest to an update data service. The update data service may include a server with a database containing updated map data.

At block 705, the method may include receiving, from the update data service, a response containing one of node digests of the child nodes of the update candidate node at the update data service, or updated content corresponding to the update candidate node.

At block 707, the method may include updating the map database, based on the received response. Further, in some example embodiments, in response to receiving updated content corresponding to the update candidate node, at block 707, the method may include recomputing the hierarchical tree structure based on the received updated content.

In an example embodiment, an apparatus for performing the method of FIG. 7 above may comprise a processor configured to perform some or each of the operations (blocks 701-707) described above. The processor may, for example, be configured to perform the operations (blocks 701-707) by performing hardware implemented logical functions, executing stored instructions, or executing algorithms for performing each of the operations. Alternatively, the apparatus may comprise means for performing each of the operations described above. In this regard, according to an example embodiment, examples of means for performing operations blocks 701-707 may comprise, for example, the processor and/or a device or circuit for executing instructions or executing an algorithm for processing information as described above.

FIG. 8 illustrates a flowchart for implementation of an exemplary method to generate update data for a map database, in accordance with an example embodiment of the disclosure. It will be understood that each block of the flowcharts and combination of blocks in the flowcharts may be implemented by various means, such as hardware, firmware, processor, circuitry, and/or other communication devices associated with execution of software including one or more computer program instructions.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

At block 801, the method may include receiving a node identifier and a first node digest of an update candidate node. At block 803, the method may include obtaining, based on the node identifier, a second node digest of the update candidate node. The obtaining of a second node digest of the update candidate node further comprises accessing a hierarchical tree structure, wherein a root node or an inner node comprises a parental node digest based on an eXclusive OR (XOR) function of the node digests of corresponding child nodes, and wherein a leaf node in the hierarchical tree structure comprises a leaf node digest based on the node identifier of the leaf node and map content associated with the node identifier of the leaf node.

At block 805, the method may include comparing the first node digest and the second node digest of the update candidate node. At block 807, the method may further include generating, based on the comparison, the update data for the map database, the update data containing one of an indication of unchanged content, node digests of the child nodes of the update candidate node or updated content corresponding to the update candidate node.

The update data for the map database contains an indication of unchanged content in case of match of the first node digest and the second node digest of the update candidate node. The update data for the map database contains node digests of child nodes of the update candidate node, if the update candidate node corresponds to a parental node and in case of mismatch of the first node digest and the second node digest of the update candidate node. Further, the update data for the map database contains updated content corresponding to the update candidate node, if the update candidate node corresponds to a leaf node and in case of mismatch of the first node digest and the second node digest of the update candidate node. In some example embodiments, the method may further include transmitting the generated update data for the map database to a client.

In an example embodiment, an apparatus for performing the method of FIG. 8 above may comprise a processor configured to perform some or each of the operations (blocks 801-807) described above. The processor may, for example, be configured to perform the operations (blocks 801-807) by performing hardware implemented logical functions, executing stored instructions, or executing algorithms for performing each of the operations. Alternatively, the apparatus may comprise means for performing each of the operations described above. In this regard, according to an example embodiment, examples of means for performing operations blocks 801-807 may comprise, for example, the processor and/or a device or circuit for executing instructions or executing an algorithm for processing information as described above.

IV. Apparatus, Methods, and Computer Program Products

As described above, FIGS. 6A-6D, 7, and 8 illustrate flowcharts of a network 109 and/or user equipment 111, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device, such as the memory 203 or 303 of an apparatus employing an embodiment of the present invention and executed by the processor, such as the processor 201 or 301 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for generating update data for a map database, the method comprising:
　　receiving, by at least one processor, a node identifier and a first node digest of an update candidate node;
　　obtaining by the at least one processor, based on the node identifier, a second node digest of the update candidate node;
　　comparing, by the at least one processor, the first node digest and the second node digest of the update candidate node; and
　　generating by the at least one processor, based on the comparison, the update data for the map database, the update data containing one of:
　　　an indication of unchanged content;
　　　node digests of child nodes of the update candidate node; or updated content corresponding to the update candidate node,
  wherein a node corresponds to a map tile or cube, and a node digest of the node corresponds to a hash value.

2. The method of claim 1, further comprising: transmitting the update data for the map database to a client, wherein the hash value is generated by hashing a node identifier, content, or a combination thereof of the node.

3. The method of claim 1, wherein the update data for the map database contains the indication of unchanged content in case of match of the first node digest and the second node digest of the update candidate node, and wherein the hash value is zero or null when the node has no content.

4. The method of claim 2, wherein the update data for the map database contains node digests of the child nodes of the update candidate node, when the update candidate node corresponds to a parent node of the child nodes and in case of mismatch of the first node digest and the second node digest of the update candidate node, and
  wherein the client compares the received node digests of the child nodes with node digests of the corresponding child nodes, and transmits a node digest and a node identifier of at least one mismatched child node digest to the at least one processor for update content corresponding to at least one respective child node.

5. The method of claim 2, wherein the update data for the map database contains the updated content corresponding to the update candidate node, when the update candidate node corresponds to a leaf node and in case of mismatch of the first node digest and the second node digest of the update candidate node.

6. The method of claim 4, wherein obtaining the second node digest of the update candidate node comprises:
  accessing the map database for a hierarchical tree structure containing the update candidate node,
  wherein a parental node digest of a root node or a parent node in the hierarchical tree structure is based on an eXclusive OR (XOR) function of node digests of corresponding child nodes of the root node or the parent node, and
  wherein a leaf node digest of a leaf node in the hierarchical tree structure is hashed based on the node identifier of the leaf node and map content associated with the node identifier of the leaf node.

7. The method of claim 6, further comprising: in response to a data service-side content update, recomputing the hierarchical tree structure based on the updated content.

8. The method of claim 1, further comprising associating a map area identifier to a map tile of a quad-tree map data structure, wherein tiles corresponding to quad-tree leaf nodes are data tiles.

9. The method of claim 8, further comprising associating the map area identifier to a map cube of an oct-tree map data structure, wherein cubes corresponding to oct-tree leaf nodes are data cubes.

10. An apparatus for generating update data for a map database, the apparatus comprising:
  at least one memory configured to store computer executable instructions; and
  at least one processor configured to execute the computer executable instructions to:
    receive a node identifier and a first node digest of an update candidate node;
    obtain, based on the node identifier, a second node digest of the update candidate node;
    compare the first node digest and the second node digest of the update candidate node; and
    generate, based on the comparison, the update data for the map database, the update data containing one of:
      an indication of unchanged content;
      node digests of child nodes of the update candidate node; or
      updated content corresponding to the update candidate node,
    wherein a node corresponds to a map tile or cube, and a node digest of the node corresponds to a hash value.

11. The apparatus of claim 10, wherein the at least one processor is further configured to transmit the update data for the map database to a client, and wherein the hash value is generated by hashing a node identifier, content, or a combination thereof of the node.

12. The apparatus of claim 10, wherein the update data for the map database contains the indication of unchanged content in case of match of the first node digest and the second node digest of the update candidate node, and wherein the hash value is zero or null when the node has no content.

13. The apparatus of claim 11, wherein the update data for the map database contains node digests of the child nodes of the update candidate node, when the update candidate node corresponds to a parent node of the child nodes and in case of mismatch of the first node digest and the second node digest of the update candidate node, and
  wherein the client compares the received node digests of the child nodes with node digests of the corresponding child nodes, and transmits a node digest and a node identifier of at least one mismatched child node digest to the at least one processor for update content corresponding to at least one respective child node.

14. The apparatus of claim 11, wherein the update data for the map database contains the updated content corresponding to the update candidate node, when the update candidate node corresponds to a leaf node and in case of mismatch of the first node digest and the second node digest of the update candidate node.

15. The apparatus of claim 13, wherein to obtain a second node digest of the update candidate node, the at least one processor is further configured to:
  access the map database for a hierarchical tree structure containing the update candidate node,
  wherein a parental node digest of a root node or a parent node in the hierarchical tree structure is based on an eXclusive OR (XOR) function of node digests of corresponding child nodes of the root node or the parent node, and
  wherein a leaf node digest of a leaf node in the hierarchical tree structure is hashed based on the node identifier of the leaf node and map content associated with the node identifier of the leaf node.

16. The apparatus of claim 10, wherein the at least one processor is further configured to associate a map area identifier to a map tile of a quad-tree map data structure, wherein tiles corresponding to quad-tree leaf nodes are data tiles.

17. The apparatus of claim 16, wherein the at least one processor is further configured to associate the map area identifier to a map cube of an oct-tree map data structure, wherein cubes corresponding to oct-tree leaf nodes are data cubes.

18. A non-transitory computer-readable medium having stored thereon computer-executable instructions which when executed by one or more processors, cause an apparatus to carry out operations for generating update data for a map database, the operations comprising:

receiving a node identifier and a first node digest of an update candidate node;

obtaining, based on the node identifier, a second node digest of the update candidate node;

comparing the first node digest and the second node digest of the update candidate node; and generating, based on the comparison, the update data for the map database, the update data containing one of:
- an indication of unchanged content;
- node digests of child nodes of the update candidate node; or
- updated content corresponding to the update candidate node, wherein a node corresponds to a map tile or cube, and a node digest of the node corresponds to a hash value.

19. The non-transitory computer-readable medium of claim 18, wherein the operations further comprise transmitting the update data for the map database to a client, wherein the hash value is generated by hashing a node identifier, content, or a combination thereof of the node.

20. The non-transitory computer-readable medium of claim 19, wherein the update data for the map database contains node digests of the child nodes of the update candidate node, when the update candidate node corresponds to a parent node of the child nodes and in case of mismatch of the first node digest and the second node digest of the update candidate node, and wherein the client compares the received node digests of the child nodes with node digests of the corresponding child nodes, and transmits a node digest and a node identifier of at least one mismatched child node digest to the at least one processor for update content corresponding to at least one respective child node.

21. The non-transitory computer-readable medium of claim 20, wherein to obtain a second node digest of the update candidate node, the operations further comprise:
- accessing the map database for a hierarchical tree structure containing the update candidate node,
- wherein a parental node digest of a root node or a parent node in the hierarchical tree structure is based on an eXclusive OR (XOR) function of node digests of corresponding child nodes of the root node or the parent node, and
- wherein a leaf node digest of a leaf node in the hierarchical tree structure is hashed based on the node identifier of the leaf node and map content associated with the node identifier of the leaf node.

22. The non-transitory computer-readable medium of claim 19, wherein the update data for the map database contains the updated content corresponding to the update candidate node, when the update candidate node corresponds to a leaf node and in case of mismatch of the first node digest and the second node digest of the update candidate node.

* * * * *